(12) United States Patent
Ryu et al.

(10) Patent No.: US 11,149,592 B2
(45) Date of Patent: Oct. 19, 2021

(54) COMBINED POWER GENERATION APPARATUS

(71) Applicants: KOREA ELECTRIC POWER CORPORATION, Jeollanam-do (KR); HYUNDAI HEAVY INDUSTRIES CO., LTD., Ulsan (KR)

(72) Inventors: Gwang Nyeon Ryu, Seoul (KR); Jin Ki Ham, Seoul (KR); Beom Joo Kim, Chungcheongbuk-do (KR); Cheol Hee Lee, Daejeon (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 65 days.

(21) Appl. No.: 16/620,852

(22) PCT Filed: Jan. 22, 2018

(86) PCT No.: PCT/KR2018/000958
§ 371 (c)(1),
(2) Date: Dec. 9, 2019

(87) PCT Pub. No.: WO2018/225922
PCT Pub. Date: Dec. 13, 2018

(65) Prior Publication Data
US 2020/0200049 A1 Jun. 25, 2020

(30) Foreign Application Priority Data
Jun. 9, 2017 (KR) .................. 10-2017-0072462

(51) Int. Cl.
*F01K 23/06* (2006.01)
*F02M 26/04* (2016.01)
(Continued)

(52) U.S. Cl.
CPC ............ *F01K 23/065* (2013.01); *A62C 35/58* (2013.01); *B08B 5/02* (2013.01); *F01K 13/02* (2013.01);
(Continued)

(58) Field of Classification Search
CPC ........ F01K 23/065; F01K 13/02; F01K 15/04; F01K 23/10; F02M 26/04; F02M 26/14;
(Continued)

(56) References Cited

U.S. PATENT DOCUMENTS 6,817,185 B2 * 11/2004 Coney ....................... F02G 5/00
60/772
8,919,123 B2 * 12/2014 Gibble .................. F01K 23/065
60/618
(Continued)

FOREIGN PATENT DOCUMENTS

JP 2013-238131 11/2013
KR 10-2012-0128528 11/2012
(Continued)

OTHER PUBLICATIONS

International Search Report for PCT/KR2018/000958 dated Apr. 23, 2018 and its English translation from WIPO (now published as WO2019/225922).
(Continued)

*Primary Examiner* — Thai Ba Trieu
(74) *Attorney, Agent, or Firm* — Ladas & Parry, LLP (57) ABSTRACT

A composite power generating device of the present invention includes an engine (110), a first flow line (121), a turbocharger (130), a second flow line (122), a third flow line (123), a compressor (211), a first medium line (221), a medium turbine (212), a second medium line (222), a working medium cooler (213), a recuperator (215), a power generating unit (214), a cross-line (233), a first heat
(Continued)

exchanger (251), a second heat exchanger (252), and a third heat exchanger (253).

17 Claims, 6 Drawing Sheets

(51) Int. Cl.

| | |
|---|---|
| *F02M 26/14* | (2016.01) |
| *F02M 26/23* | (2016.01) |
| *F02M 26/34* | (2016.01) |
| *A62C 35/58* | (2006.01) |
| *B08B 5/02* | (2006.01) |
| *F01K 23/02* | (2006.01) |
| *F01K 15/04* | (2006.01) |
| *F01K 23/10* | (2006.01) |
| *F02B 37/12* | (2006.01) |
| *F02C 6/12* | (2006.01) |
| *F28G 1/16* | (2006.01) |
| *F02G 5/02* | (2006.01) |
| *F02G 5/04* | (2006.01) |
| *F01K 13/02* | (2006.01) |

(52) U.S. Cl.
CPC .............. *F01K 15/04* (2013.01); *F01K 23/10* (2013.01); *F02B 37/12* (2013.01); *F02C 6/12* (2013.01); *F02G 5/02* (2013.01); *F02M 26/04* (2016.02); *F02M 26/14* (2016.02); *F02M 26/23* (2016.02); *F02M 26/34* (2016.02); *F28G 1/166* (2013.01); *F02G 5/04* (2013.01)

(58) Field of Classification Search
CPC ........ F02M 26/23; F02M 26/34; F02B 37/12; F02C 6/12; F02G 5/02; F02G 5/04; F28G 1/166; B08B 5/02
USPC .................................. 60/618, 616, 604, 464
See application file for complete search history.

(56) References Cited

U.S. PATENT DOCUMENTS

| | | | | |
|---|---|---|---|---|
| 9,021,808 | B2* | 5/2015 | Nelson ................. | F01K 23/065 60/618 |
| 2009/0211253 | A1* | 8/2009 | Radcliff ................ | F01K 23/065 60/670 |
| 2012/0192560 | A1* | 8/2012 | Ernst .................... | F01K 23/065 60/616 |
| 2013/0263594 | A1* | 10/2013 | Hall ...................... | F01K 23/065 60/618 |
| 2014/0137554 | A1* | 5/2014 | Ernst .................... | F02G 5/04 60/618 |
| 2015/0076831 | A1* | 3/2015 | Giegel .................. | F01K 23/12 60/671 |
| 2015/0330261 | A1* | 11/2015 | Held ..................... | F02G 5/02 60/326 |
| 2015/0377076 | A1* | 12/2015 | Giegel .................. | F01K 23/12 60/645 |
| 2016/0017758 | A1* | 1/2016 | Vermeersch .......... | F01K 13/02 60/646 |
| 2016/0061059 | A1* | 3/2016 | Ernst .................... | F01K 23/065 60/616 |
| 2016/0138429 | A1* | 5/2016 | Son ...................... | F01K 23/065 60/645 |
| 2016/0138430 | A1* | 5/2016 | Son ...................... | F01K 23/10 60/618 |
| 2016/0138432 | A1* | 5/2016 | Son ...................... | F02G 5/02 60/618 |
| 2016/0138532 | A1* | 5/2016 | Son ...................... | F02M 26/04 60/605.2 |
| 2018/0051652 | A1* | 2/2018 | Filippone ............. | F02G 5/02 |
| 2019/0063685 | A1* | 2/2019 | Sinatov ................ | F01K 23/10 |
| 2019/0234343 | A1* | 8/2019 | Park ..................... | F01K 23/065 |
| 2019/0309997 | A1* | 10/2019 | Fletcher ............... | F25B 9/004 |
| 2020/0141353 | A1* | 5/2020 | Filippone ............. | F02G 5/02 |

FOREIGN PATENT DOCUMENTS

| | | |
|---|---|---|
| KR | 10-2015-0115650 | 10/2015 |
| KR | 10-2016-0073349 | 6/2016 |
| KR | 10-1644942 | 8/2016 |
| KR | 10-2017-0009336 | 1/2017 |

OTHER PUBLICATIONS

Written Opinion of the International Searching Authority for PCT/KR2018/000958 dated Apr. 23, 2018 and its English translation by Google Translate (now published as WO2018/225922).

* cited by examiner

COMBINED POWER GENERATION APPARATUS

CROSS-REFERENCE TO RELATED APPLICATIONS

The present application is the U.S. National Phase of PCT Application No. PCT/KR2018/000958 filed on Jan. 22, 2018, which claims the priority to Korean Patent Application No. 10-2017-0072462 filed on Jun. 9, 2017, the entire contents of which are incorporated herein by reference.

TECHNICAL FIELD

The present invention relates to a composite power generating device. More particularly, the present invention relates to a composite power generating device which can generate power using waste heat from an engine.

BACKGROUND ART

As climate change becomes a matter of world concern, every country is actively coping with the climate change. Major countries adopt a variety of policies to reduce greenhouse operating media. The field of ships adopts Energy Efficiency Design Index for new ships (EEDI) and regulates to satisfy energy efficiency standards in a new ship design and construction. Since 2015, Northern Europe (including the Baltic sea, the north sea, and the English channel) and North America (200 nautical miles from the US and Canada coasts) enforce ECA (emission control area of exhaust working medium) to establish emission control areas of exhaust working medium, thus allowing only highly efficient and eco-friendly ships to ply. As such, various regulatory policies are being prepared.

In the past, a waste-heat recovery device for an engine of a ship is applied simply to reduce fuel cost. However, in recent years, the need for the waste-heat recovery device is increasing to obey strengthened environmental regulations, in addition to reducing the fuel cost. This trend is expected to be gradually strengthened even in the field of engine power generation. Power generation companies make efforts to cope with the strengthened environmental regulations by modifying an engine using High Sulfur Fuel Oil (HFO) into a clean working-medium fuel engine, or by installing a separate waste-heat recovery device for an engine.

An existing power generating method in which steam is generated to drive a steam turbine is problematic in that efficiency is very low due to the low temperature of a heat source, the configuration of a device is complicated, and the volume of the device is also large.

As the related art of the present invention, Korean Laid-Open Patent Publication No. 2017-0009336 (published on Jan. 25, 2017, Title of invention: System and method for optimizing ship energy efficiency) has been proposed.

DISCLOSURE

Technical Problem

The present invention has been made to solve the above-mentioned problems and difficulties and relates to a composite power generating device, which can generate power using waste heat from an engine.

Technical Solution

A composite power generating device according to the present invention includes an engine driven by combustion of fuel; a first flow line connected to the engine; a turbocharger connected to the first flow line, and compressing scavenging air discharged from the engine; a second flow line connecting the turbocharger with the engine so that the scavenging air compressed in the turbocharger is supplied to the engine; a third flow line branched off from the first flow line so that exhaust gas of the first flow line is discharged to an outside; a compressor compressing a working medium; a first medium line connected to the compressor; a medium turbine connected to the first medium line, and driven by the working medium fed from the first medium line; a second medium line connecting the medium turbine with the compressor; a working medium cooler connected to the second medium line, and cooling the working medium discharged from the medium turbine; a recuperator connected to the first medium line and the second medium line, and performing a heat exchange process between the first medium line and the second medium line; a power generating unit installed in the medium turbine to generate power by power that is produced from the medium turbine; a recuperator bypass line connected to an inlet side and an outlet side of the recuperator in the first medium line; a cross-line connected in parallel with the recuperator bypass line to connect an inlet side and an outlet side of the recuperator bypass line; a first heat exchanger connected to the recuperator bypass line and the second flow line to perform a heat exchange process between the working medium of the recuperator bypass line and the scavenging air of the second flow line; a second heat exchanger connected to the cross-line and the third flow line to perform a heat exchange process between the working medium of the cross-line and the exhaust gas of the third flow line; and a third heat exchanger connected to the third flow line and the first medium line to perform a heat exchange process between the exhaust gas of the third flow line and the working medium of the first medium line.

The first heat exchanger may be disposed on the recuperator bypass line in parallel with the recuperator, the second heat exchanger may be disposed on the cross-line in parallel with the first heat exchanger, and the third heat exchanger may be disposed between the recuperator and the medium turbine in series with the recuperator.

The composite power generating device may further include a first regulating valve installed at the third flow line to regulate an opening degree of the third flow line.

The composite power generating device may further include a fourth flow line branched off from the third flow line to discharge the exhaust gas of the third flow line to an outside; and a second regulating valve installed at the fourth flow line to regulate an opening degree of the fourth flow line.

The composite power generating device may further include a scavenging-air cooler installed in the second flow line to cool the scavenging air of the second flow line.

The composite power generating device may further include a first flow distribution valve disposed on a portion at which the first medium line and the inlet side of the recuperator bypass line are connected, and controlling a flow rate of the working medium that flows to the recuperator and the recuperator bypass line; and a second flow distribution valve disposed on a portion at which the recuperator bypass line and an inlet side of the cross-line are connected, and controlling the flow rate of the working medium that flows to the first heat exchanger and the second heat exchanger.

The composite power generating device may further include an inventory line connecting the first medium line with the second medium line; an inventory tank replenishing the working medium to the second medium line via the inventory line; and an inventory valve installed at either side of the inventory line.

One side of the inventory line may be connected between an outlet side of the compressor and the inlet side of the recuperator in the first medium line, and the other side of the inventory line may be connected between the outlet side of the recuperator and an inlet side of the compressor in the second medium line.

The composite power generating device may include a vacuum pump connected to the second medium line to create a vacuum state in the second medium line; a booster pump connected to the second medium line to inject the working medium into the second medium line; and a storage tank connected to the booster pump to supply the working medium to the booster pump.

The composite power generating device may further include a replenishment line connecting the booster pump with the inventory tank to replenish the working medium to the inventory tank.

The composite power generating device may further include a cleaning blower installed to spray the working medium onto the second heat exchanger and the third heat exchanger to eliminate fouling; and a cleaning line connected to the cleaning blower to supply the working medium to the cleaning blower.

The cleaning line may be connected to the cleaning blower and the storage tank.

The cleaning line may be connected to the cleaning blower and the inventory tank.

The composite power generating device may further include a fire extinguisher installed between the second heat exchanger and the third heat exchanger; and a fire extinguishing line connected to the fire extinguisher to supply the working medium to the fire extinguisher.

The fire extinguishing line may be connected to the inventory tank or the storage tank.

The composite power generating device may further include a recirculation line disposed between the compressor and the recuperator, and connecting the first medium line with the second medium line to cause the working medium of the first medium line to flow to the second medium line; and a recirculation valve installed at the recirculation line.

The composite power generating device may further include a turbine bypass line disposed between the recuperator and the medium turbine, and connecting the first medium line with the second medium line to cause the working medium of the first medium line to flow to the second medium line; and a turbine bypass valve installed at the turbine bypass line.

Advantageous Effects

According to the present invention, since the thermal energy of exhaust gas and scavenging air discharged from an engine is recovered to heat a working medium of a first medium line and the heated working medium (supercritical carbon dioxide) drives a medium turbine, the power generating efficiency of the medium turbine can be improved, and the size of a power generating device can be reduced.

Furthermore, according to the present invention, since a first heat exchanger, a second heat exchanger, and a third heat exchanger recover the thermal energy of scavenging air and exhaust gas, the recovery rate of waste-heat energy can be improved.

BEST MODE

Hereinafter, an embodiment of a composite power generating device according to the present invention will be described with reference to the accompanying drawings. In the description of the composite power generating device, the thicknesses of lines or the sizes of elements shown in the drawings may be exaggerated for the clarity and convenience of description. Furthermore, terms that will be described below are defined in consideration of the functions of the present invention, and may be changed according to a user's or operator's intention or custom. Hence, these terms should be defined based on contents throughout the specification.

First, a composite power generating device in accordance with a first embodiment of the present invention will be described.

Figure 1:
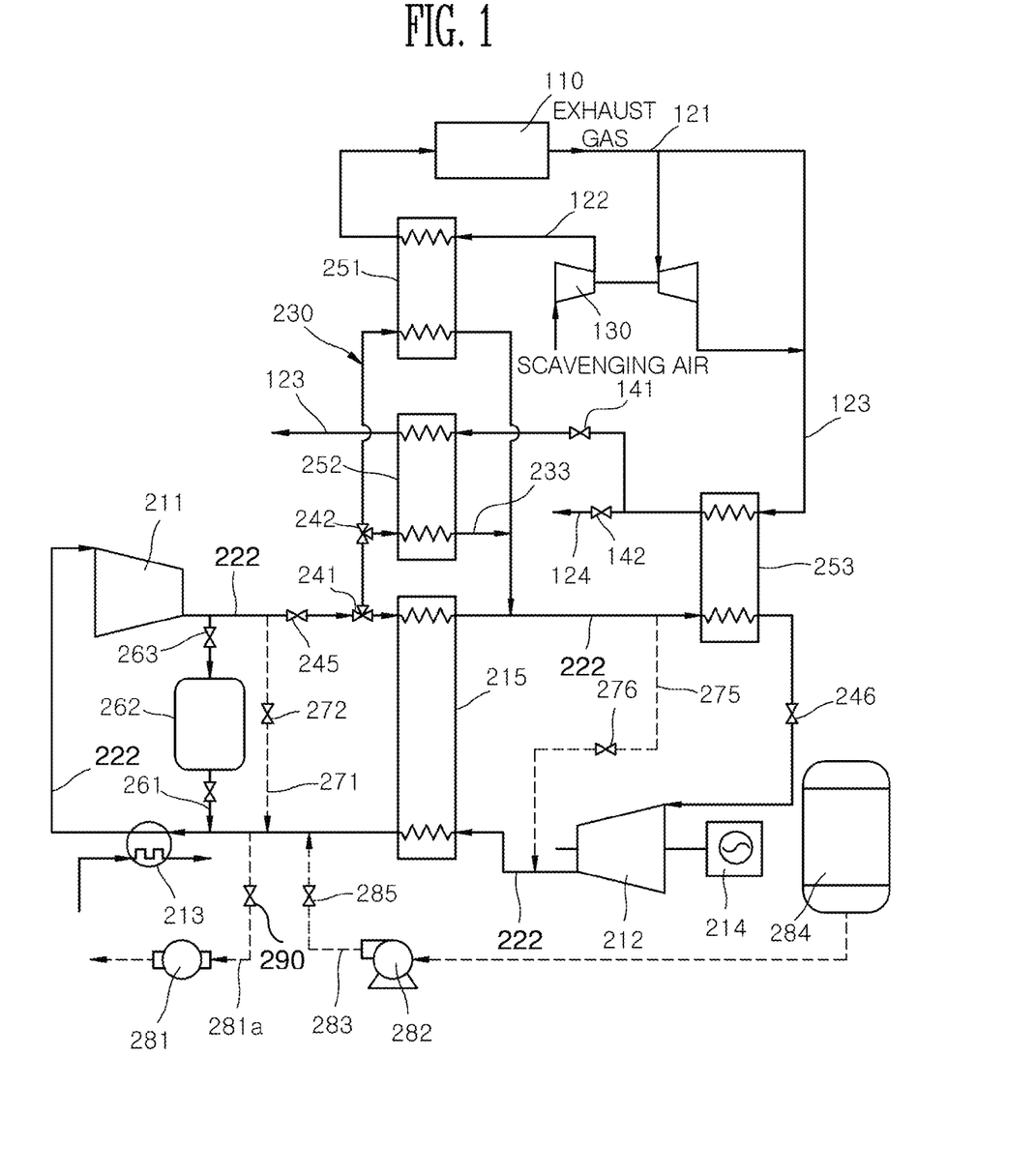
FIG. 1 is a circuit diagram illustrating a composite power generating device in accordance with a first embodiment of the present invention.

FIG. 1 is a circuit diagram illustrating the composite power generating device in accordance with the first embodiment of the present invention.

Referring to FIG. 1, the composite power generating device in accordance with the embodiment of the present invention includes an engine 110, a first flow line 121, a turbocharger 130, a second flow line 122, a third flow line 123, a compressor 211, a first medium line 221, a medium turbine 212, a second medium line 222, a working medium cooler 213, a recuperator 215, a power generating unit 214, a cross-line 233, a first heat exchanger 251, a second heat exchanger 252, and a third heat exchanger 253.

The engine 110 is driven by the combustion of fuel. As the fuel is burned in the engine 110, exhaust gas is produced. As the load of the engine 110 is changed, the flow rate and the temperature of the exhaust gas are changed. The gas discharged from the engine 110 is divided into exhaust gas that is produced as the fuel is burned, and scavenging air that flows back to the engine 110 after air is supplied to remove gas from the interior of the engine 110.

The first flow line 121 is connected to the engine 110. The exhaust gas of the engine 110 is discharged in the first flow line 121. The first flow line 121 includes a first branch line and a second branch line. The first flow line 121 connects the engine 110 with the turbocharger 130 to supply the exhaust gas discharged from the engine 110 to the turbocharger 130.

The turbocharger 130 is connected to the first flow line 121, and is driven by the exhaust gas discharged from the first flow line 121 to compress the scavenging air. The scavenging air is introduced into the turbocharger 130 by a separate flow path.

The second flow line 122 connects the turbocharger 130 with the engine 110 to supply the scavenging air compressed in the turbocharger 130 to the engine 110.

The third flow line 123 is connected to the first flow line 121 to discharge the exhaust gas of the first flow line 121 to the outside.

The scavenging air and the exhaust gas, which are relatively higher in temperature and pressure than working fluid of the first medium line 221 and the second medium line 222 that will be described below, flow in the first flow line 121, the second flow line 122, and the third flow line 123.

The compressor 211 compresses the working medium at high pressure. As the working medium, carbon dioxide may be applied. As the working medium is compressed in the compressor 211, the temperature of the working medium is increased.

The first medium line 221 is connected to the compressor 211. The working medium discharged from the compressor 211 flows in the first medium line 221. The first medium line 221 is piping that connects the compressor 211 with the medium turbine 212 to supply the working medium to the medium turbine 212.

A first throttle valve 245 is installed between the compressor 211 and the recuperator 215 in the first medium line 221, and a second throttle valve 246 is installed between the second heat exchanger 252 and the medium turbine 212. The first throttle valve 245 controls a working-medium volume that flows towards the recuperator 215, while the second throttle valve 246 controls a working-medium volume that flows into the medium turbine 212.

The medium turbine 212 is connected to the first medium line 221, and is driven by the working medium fed from the first medium line 221.

The second medium line 222 connects the medium turbine 212 with the compressor 211. The working medium discharged from the medium turbine 212 flows in the second medium line 222. The second medium line 222 is piping that connects the medium turbine 212 with the compressor 211 to supply the working medium to the compressor 211.

Since the compressed working medium discharged from the compressor 211 flows in the first medium line 221 and the working medium discharged from the turbine flows in the second medium line 222, the working medium of the first medium line 221 flows at a relatively higher temperature and pressure than the working medium of the second medium line 222. Therefore, the first medium line 221 is high-pressure piping, whereas the second medium line 222 is low-pressure piping as compared to the first medium line 221.

The working medium cooler 213 cools the working medium flowing along the second medium line 222, thus controlling the temperature of the working medium supplied to the compressor 211. Cooling medium flows in the working medium cooler 213 to exchange heat with the second medium line 222.

The recuperator 215 is connected to the first medium line 221 and the second medium line 222, and performs a heat exchange process between the first medium line 221 and the second medium line 222. Since the working medium of the first medium line 221 is relatively higher in temperature and pressure than the working medium of the second medium line 222, the temperature of the working medium flowing along the second medium line 222 may be increased.

The power generating unit 214 is installed in the medium turbine 212 to generate power by power that is generated in the medium turbine 212.

A recuperator bypass line 230 is connected to an inlet side and an outlet side of the recuperator 215 in the first medium line 221. The recuperator bypass line 230 causes the working medium discharged from the compressor 211 to flow into the outlet side of the recuperator 215 without passing through the recuperator 215.

The cross-line 233 is connected in parallel with the recuperator bypass line 230 to connect the inlet side and the outlet side of the recuperator bypass line 230. The cross-line 233 causes some of the working medium introduced into the recuperator bypass line 230 to flow to a discharge side of the recuperator bypass line 230.

The first heat exchanger 251 is connected to the recuperator bypass line 230 and the second flow line 122 to perform the heat exchange process between the working medium of the recuperator bypass line 230 and the scavenging air of the second flow line 122. The first heat exchanger 251 causes the thermal energy of the scavenging air of the second flow line 122 to be recovered to the working medium of the recuperator bypass line 230.

The second heat exchanger 252 is connected to the first medium line 221 and the third flow line 123 to perform the heat exchange process between the exhaust gas of the third flow line 123 and the working medium of the first medium line 221. The second heat exchanger 252 causes the thermal energy of the exhaust gas of the third flow line 123 to be recovered to the working medium of the first medium line 221.

The third heat exchanger 253 is connected to the third flow line 123 and the first medium line 221 to perform the heat exchange process between the exhaust gas of the third flow line 123 and the working medium of the first medium line 221. The third heat exchanger 253 causes the thermal energy of the exhaust gas of the third flow line 123 to be recovered to the working medium of the first medium line 221.

Since some of the thermal energy of the exhaust gas discharged from the engine 110 is recovered by the first heat exchanger 251, the second heat exchanger 252, and the third heat exchanger 253, the recovery rate of the waste heat from the scavenging air and the exhaust gas may be increased. Furthermore, the thermal energy recovered from the scavenging air and the exhaust gas elevates the temperature of the working fluid of the first medium line 221, and the working fluid with elevated temperature is supplied to the medium turbine 212. Therefore, since the working medium of the relatively high temperature is supplied to the medium turbine 212, the efficiency of the medium turbine 212 can be increased.

The first heat exchanger 251 is disposed in the recuperator bypass line 230 in parallel with the recuperator 215, the second heat exchanger 252 is disposed in the cross-line 233 in parallel with the first heat exchanger 251, and the third heat exchanger 253 is disposed between the recuperator 215 and the medium turbine 212 in series with the recuperator 215. The waste heat of the exhaust gas discharged from the engine 110 may be recovered to the working medium of the first medium line 221 through the first heat exchanger 251, the second heat exchanger 252, and the third heat exchanger 253. Moreover, since temperature is increased while the working medium of the first medium line 221 passes through the first heat exchanger 251, the second heat exchanger 252, and the third heat exchanger 253, the working medium of the relatively high temperature may be supplied to the medium turbine 212. Therefore, the efficiency of the medium turbine 212 can be improved.

The composite power generating device further includes a first regulating valve 141 that is installed at the third flow line 123 to regulate an opening degree of the third flow line 123. The first regulating valve 141 may regulate a heat recovery rate of the exhaust gas in the cross-line 233, by regulating the opening degree of the third flow line 123.

The composite power generating device includes a fourth flow line 124 and a second regulating valve 142. The fourth flow line 124 is branched from the third flow line 123 to discharge the exhaust gas of the third flow line 123 to the outside. The second regulating valve 142 is installed at the fourth flow line 124 to regulate the opening degree of the fourth flow line 124.

When the load of the engine 110 is increased, the flow rate and the temperature of the exhaust gas and the scavenging air discharged from the engine 110 are increased. Therefore, when the load of the engine 110 is increased, the recovery rate of the thermal energy is increased, so that waste heat may be recovered from the second heat exchanger 252. Furthermore, when the load of the engine 110 is reduced, the recovery rate of the thermal energy is reduced, so that waste heat may not be recovered from the second heat exchanger 252.

When it is unnecessary to recover the waste heat from the second heat exchanger 252, the first regulating valve 141 may be closed and the second regulating valve 142 may be opened. In this case, the working medium of the third flow line 123 is not supplied to the second heat exchanger 252 but is discharged through the fourth flow line 124 to the outside.

The composite power generating device further includes a first flow distribution valve 241, and a second flow distribution valve 242.

The first flow distribution valve 241 is disposed on a portion at which the first medium line 221 and the inlet side of the recuperator bypass line 230 are connected, thus controlling the flow rate of the working medium that flows to the recuperator 215 and the recuperator bypass line 230. By regulating the distribution ratio of the first flow distribution valve 241, a ratio of the working medium flowing to the recuperator 215 to the working medium flowing to the recuperator bypass line 230 may be regulated. Therefore, the waste-heat recovery rate of the first heat exchanger 251 and the second heat exchanger 252 may be controlled.

The second flow distribution valve 242 is disposed on a portion at which the recuperator bypass line 230 and the inlet side of the cross-line 233 are connected, thus controlling the flow rate of the working medium that flows to the first heat exchanger 251 and the second heat exchanger 252. By regulating the distribution ratio of the second flow distribution valve 242, a ratio of the working medium flowing to the first heat exchanger 251 to the working medium flowing to the second heat exchanger 252 may be controlled.

The composite power generating device includes an inventory line 261, an inventory tank 262, and an inventory valve 263.

The inventory line 261 connects the first medium line 221 with the second medium line 222. One side of the inventory line 261 is connected between the outlet side of the compressor 211 and the inlet side of the recuperator 215 in the first medium line 221, while the other side of the inventory line 261 is connected between the outlet side of the recuperator 215 and the inlet side of the compressor 211 in the second medium line 222. Since the other side of the inventory line 261 is connected between the outlet side of the recuperator 215 and the inlet side of the compressor 211 in the second medium line 222, the working medium replenished in the second medium line 222 may be compressed in the compressor 211 and then supplied to the medium turbine 212.

The working medium that is to be replenished in the second medium line 222 is previously stored in the inventory tank 262. The inventory valve 263 is disposed on either side of the inventory tank 262. If the inventory valve 263 on the high-pressure side is opened, the working medium of the first medium line 221 flows into the inventory tank 262. Furthermore, if the inventory valve 263 on the low-pressure side is opened, the working medium of the inventory tank 262 flows into the second medium line 222. Therefore, the pressure and the flow rate of a working medium system including the first medium line 221 and the second medium line 222 may be regulated by controlling the inventory valve 263. The inventory valve 263 regulates the pressure of the working medium system to optimize the heat exchange efficiency of the heat exchange unit according to a change in load of the engine 110.

The composite power generating device includes a recirculation line 271 and a recirculation valve 272.

The recirculation line 271 is disposed between the compressor 211 and the recuperator 215, and connects the first medium line 221 with the second medium line 222 to cause the working medium of the first medium line 221 to flow to the second medium line 222. One side of the recirculation line 271 is connected to the first medium line 221, while the other side of the recirculation line 271 is connected to the second medium line 222. The recirculation valve 272 is installed at the recirculation line 271.

During the initial operation of the compressor 211, the first throttle valve 245 is opened, and the recirculation valve 272 is opened. If the recirculation valve 272 is opened, the working medium discharged from the compressor 211 flows through the recirculation line 271 to the second medium line 222 by the pressure gradient of the first medium line 221 and the second medium line 222. Here, by regulating the opening degree of the recirculation valve 272, the working-medium volume introduced into the recirculation line 271 may be regulated. Therefore, until the working medium compressed in the compressor 211 reaches a preset pressure during the initial operation of the compressor 211, the working medium may be prevented from flowing into the medium turbine 212. If the pressure of the working medium discharged from the compressor 211 reaches the preset pressure, the first throttle valve 245 is opened, and the recirculation valve 272 is closed.

The composite power generating device includes a turbine bypass line 275 and a turbine bypass valve 276.

The turbine bypass line 275 is disposed between the recuperator 215 and the turbine, and connects the first medium line 221 with the second medium line 222 to cause the working medium of the first medium line 221 to flow to the second medium line 222. One side of the turbine bypass line 275 is connected to the first medium line 221, while the other side of the turbine bypass line 275 is connected to the second medium line 222.

The turbine bypass valve 276 is installed at the turbine bypass line 275. During the initial operation of the medium turbine 212, the second throttle valve 246 is closed, and the turbine bypass valve 276 is opened. In this case, the working medium of the first medium line 221 is bypassed through the turbine bypass line 275 to the second medium line 222. If the driving speed of the medium turbine 212 is increased, the opening degree of the second throttle valve 246 is gradually increased, and the opening degree of the turbine bypass valve 276 is gradually reduced.

Therefore, since the supply volume of the working medium is gradually increased as the driving speed of the medium turbine 212 is increased, the medium turbine 212 may be prevented from being damaged by the working medium during the initial operation of the medium turbine 212.

Furthermore, as the load of the engine 110 is changed, the flow rate of the exhaust gas may be changed. As the flow rate of the exhaust gas is changed, the recovery rate of the waste heat recovered to the working medium of the first medium line 221 is also changed. Therefore, as the load of the engine 110 is changed, the pressure and the flow rate of the working medium may be regulated in the second medium line 222 and the first medium line 221 by regulating the inventory valve 263.

Furthermore, when the operating conditions of the medium turbine 212 such as a change in load of the engine 110 or emergency situations are changed, the recirculation valve 272 or the turbine bypass valve may be regulated to bypass the working medium of the first medium line 221 to the second medium line 222. Furthermore, devices of the power generating system may be protected by closing the first throttle valve 245 and the second throttle valve 246 or regulating the opening degree.

The composite power generating device includes a vacuum pump 281, a booster pump 282, and a storage tank 284.

The vacuum pump 281 is connected to the second medium line 222 to maintain the vacuum state of the second medium line 222. The vacuum pump 281 is connected to the second medium line 222 by the vacuum line 281a with a valve 290, The booster pump 282 is connected to the second medium line 222 to inject the working medium into the second medium line 222. The storage tank 284 is connected to the booster pump 282 to supply the working medium to the booster pump 282. The booster pump 282, the storage tank 284, and the second medium line 222 are connected by a replenishment line 283 with a valve 285.

As the vacuum pump 281 is driven, the working medium of the storage tank 284 is replenished to the second medium line 222. Therefore, depending on a change in load of the engine 110 or a change in load of the medium turbine 212, the pressure of the working medium in the second medium line 222 may be regulated. As the booster pump 282 is driven, air and fouling are discharged from the second medium line 222, and the vacuum state is maintained in the second medium line 222.

Next, a composite power generating device according to a second embodiment of the present invention will be described. Since the second embodiment is substantially equal to the first embodiment except for a scavenging-air cooler, a third flow line, and a fourth flow line, only the characteristics of the second embodiment will be described below.

Figure 2:
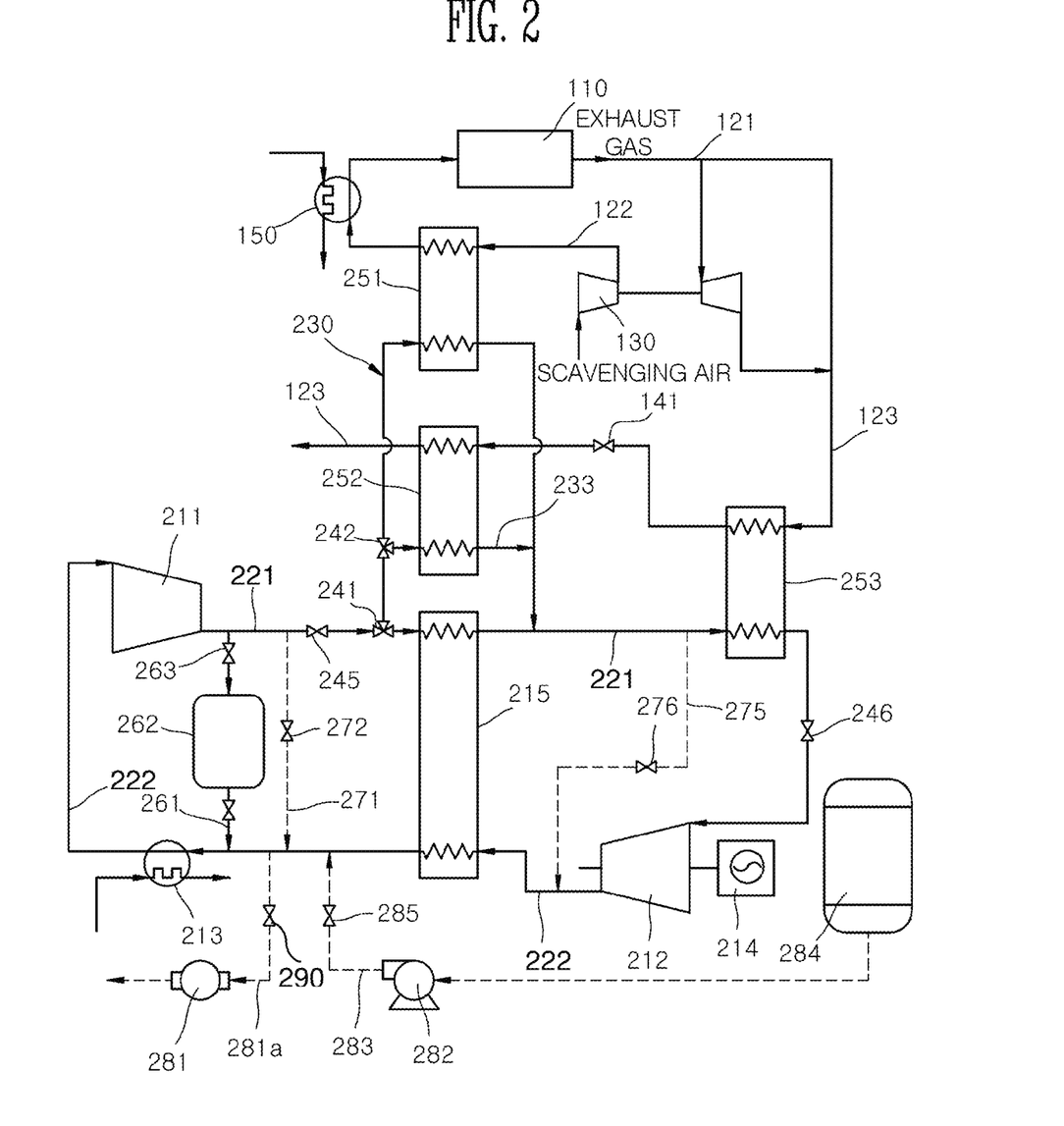
FIG. 2 is a circuit diagram illustrating a composite power generating device in accordance with a second embodiment of the present invention.

FIG. 2 is a circuit diagram illustrating the composite power generating device in accordance with the second embodiment of the present invention.

Referring to FIG. 2, the scavenging-air cooler 150 is installed at the second flow line 122 to cool the exhaust gas of the second flow line 122. As the flow rate of the cooling medium supplied to the scavenging-air cooler 150 is regulated, the cooling speed of the scavenging-air cooler 150 may be regulated. Since the exhaust gas of the second flow line 122 is cooled by the first heat exchanger 251 and the scavenging-air cooler 150, exhaust gas cooled to a temperature required for the engine 110 may be supplied. Therefore, the output of the engine 110 may be increased.

Furthermore, unlike the first embodiment, a fourth exhaust line may not branch off from the third flow line 123. Further, the first regulating valve 141 may not be installed at the third flow line 123.

Next, a composite power generating device according to a third embodiment of the present invention will be described. Since the third embodiment is substantially equal to the first embodiment except for a cleaning blower and a cleaning line, only the characteristics of the third embodiment will be described below.

Figure 3:
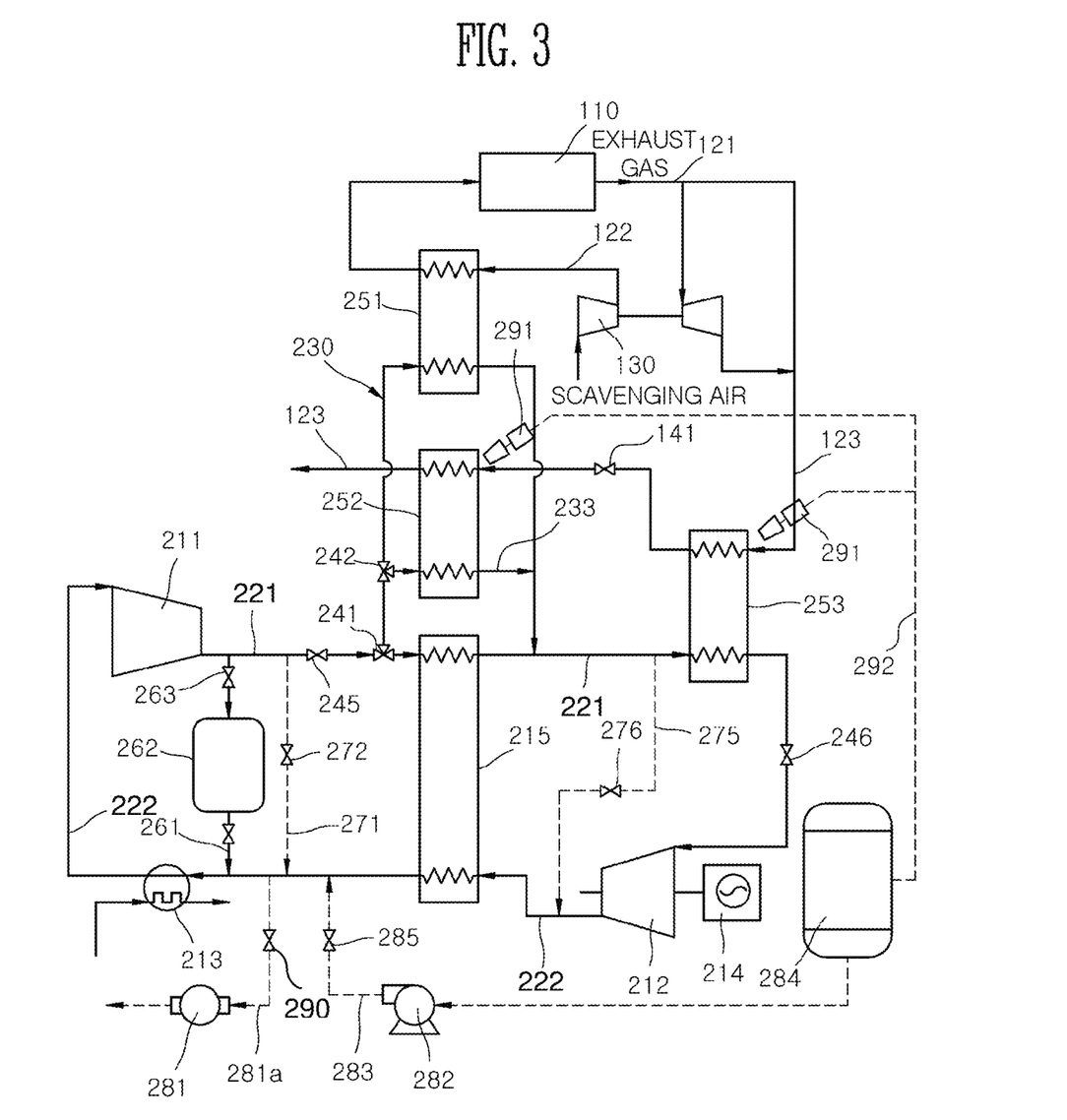
FIG. 3 is a circuit diagram illustrating a composite power generating device in accordance with a third embodiment of the present invention.

FIG. 3 is a circuit diagram illustrating the composite power generating device in accordance with the third embodiment of the present invention.

Referring to FIG. 3, the composite power generating device in accordance with the third embodiment of the present invention further includes a cleaning blower 291 and a cleaning line 292.

The cleaning blower 291 is installed to spray the working medium onto the second heat exchanger 252 and the third heat exchanger 253 to eliminate fouling. The cleaning line 292 is connected to the cleaning blower 291 to supply the working medium to the cleaning blower 291. Therefore, it is possible to prevent a fire from breaking out due to the fouling of the exhaust gas attached to the second heat exchanger 252 and the third heat exchanger 253. The cleaning blower may be installed at the first heat exchanger 251.

The cleaning line 292 is connected to the cleaning blower 291 and the storage tank 284. Therefore, the working medium stored in the storage tank 284 may be supplied through the cleaning line 292 to the cleaning blower 291.

Next, a composite power generating device according to a fourth embodiment of the present invention will be described. Since the fourth embodiment is substantially equal to the third embodiment except for a connecting structure of a cleaning line, only the characteristics of the fourth embodiment will be described below.

Figure 4:
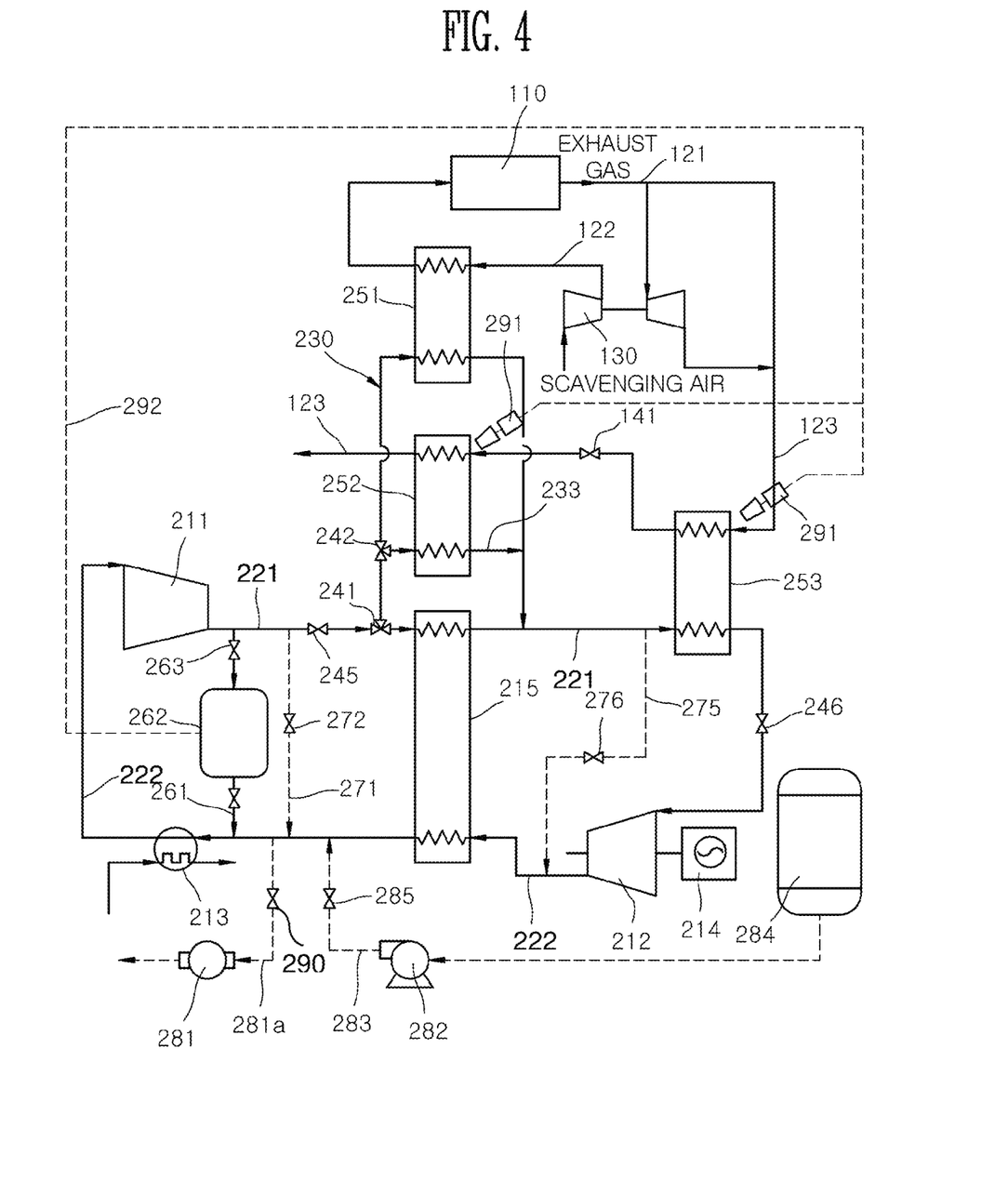
FIG. 4 is a circuit diagram illustrating a composite power generating device in accordance with a fourth embodiment of the present invention.

FIG. 4 is a circuit diagram illustrating the composite power generating device in accordance with the fourth embodiment of the present invention.

Referring to FIG. 4, the cleaning line 292 of the composite power generating device in accordance with the fourth embodiment of the present invention is connected to the cleaning blower 291 and the inventory tank 262. Since the working medium of the inventory tank 262 is supplied to the cleaning blower 291, it is possible to remove fouling attached to the second heat exchanger 252 and the third heat exchanger 253 using the working medium of the inventory tank 262.

Furthermore, the cleaning line 292 may be connected to a medium replenishment line 283 that connects the booster pump 282 to the second medium line 222. In this case, the working medium of the medium replenishment line 283 is supplied to the cleaning blower 291.

Next, a composite power generating device according to a fifth embodiment of the present invention will be described. Since the fifth embodiment is substantially equal to the first embodiment except for a fire extinguisher and a fire extinguishing line, only the characteristics of the fifth embodiment will be described below.

Figure 5:
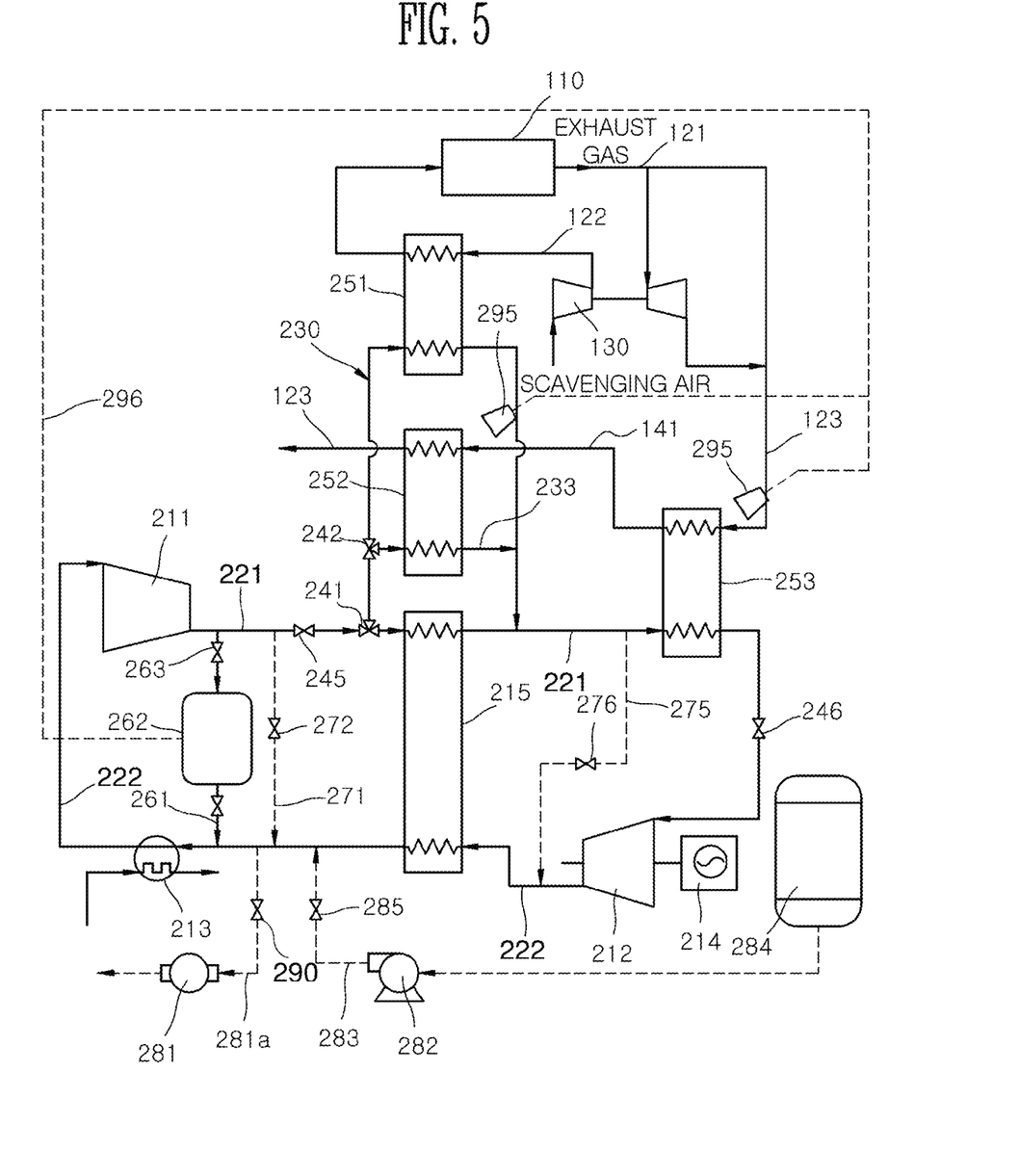
FIG. 5 is a circuit diagram illustrating a composite power generating device in accordance with a fifth embodiment of the present invention.

FIG. 5 is a circuit diagram illustrating the composite power generating device in accordance with the fifth embodiment of the present invention.

Referring to FIG. 5, the composite power generating device in accordance with the fifth embodiment of the present invention includes a fire extinguisher 295 and a fire extinguishing line 296.

The fire extinguisher 295 is installed at each of the second heat exchanger 252 and the third heat exchanger 253 to spray the working medium onto the second heat exchanger 252 and the third heat exchanger 253. The fire extinguisher 295 extinguishes flames in the event of fire in each of the second heat exchanger 252 and the third heat exchanger 253. The fire extinguisher 295 may be installed at the first heat exchanger 251.

The fire extinguishing line 296 is connected to the fire extinguisher 295 to supply the working medium to the fire extinguisher 295. Here, the fire extinguishing line 296 is connected to the inventory tank 262 or the storage tank 284.

Next, a composite power generating device according to a sixth embodiment of the present invention will be described. Since the sixth embodiment is substantially equal to the first embodiment except for a connection line 286, only the characteristics of the sixth embodiment will be described below.

Figure 6:
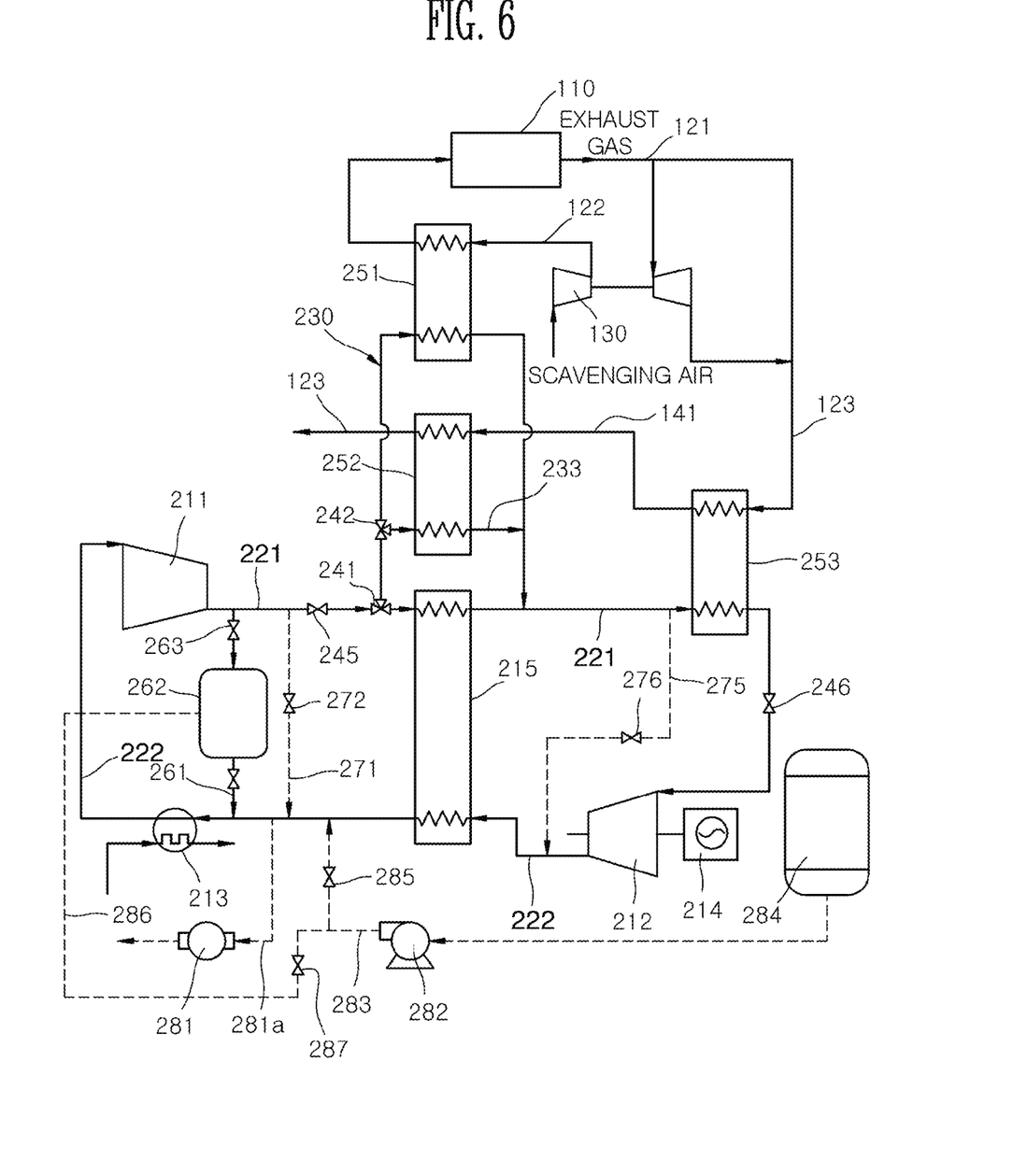
FIG. 6 is a circuit diagram illustrating a composite power generating device in accordance with a sixth embodiment of the present invention.

FIG. 6 is a circuit diagram illustrating the composite power generating device in accordance with the sixth embodiment of the present invention.

Referring to FIG. 6, the composite power generating device in accordance with the sixth embodiment of the present invention includes a connection line 286. The connection line 286 connects a replenishment line 283 of a booster pump 282 with an inventory tank 262. An on/off valve 287 is installed at the connection line 286 to open or close the connection line 286.

If the on/off valve 287 is opened and the booster pump 282 is driven, the working medium of the storage tank 284 is supplied through the replenishment line 283 and the connection line 286 to the inventory tank 262. Therefore, when the inventory tank 262 requires the working medium, the working medium may be replenished to the inventory tank 262.

As such, in the embodiments according to the present invention, the thermal energy of the exhaust gas and the scavenging air of the engine 110 is recovered to elevate the temperature of the working medium of the first medium line 221, and the working medium (supercritical carbon dioxide) with the elevated temperature drives the medium turbine 212, so that the power generating efficiency of the medium turbine 212 can be improved, and the size of the power generating device can be reduced.

While the present invention has been particularly described with reference to exemplary embodiments shown in the drawings, it will be understood by those of ordinary skill in the art that the exemplary embodiments have been described for illustrative purposes, and various changes and modifications may be made without departing from the spirit and scope of the present invention as defined by the appended claims.

Therefore, the true scope of the present invention should be defined solely by the following claims.

The invention claimed is:

1. A composite power generating device, comprising:
an engine driven by combustion of fuel;
a first flow line connected to the engine;
a turbocharger connected to the first flow line, compressing scavenging air to the engine, and discharged exhaust gas from the engine;
a second flow line connecting the turbocharger with the engine so that the scavenging air compressed in the turbocharger is supplied to the engine;
a third flow line branched off from the first flow line so that the exhaust gas of the first flow line is discharged to an outside;
a compressor compressing a working medium;
a first medium line connected to the compressor;
a medium turbine connected to the first medium line, and driven by the working medium fed from the first medium line;
a second medium line connecting the medium turbine with the compressor;
a working medium cooler connected to the second medium line, and cooling the working medium discharged from the medium turbine;
a recuperator connected to the first medium line and the second medium line, and performing a heat exchange process between the first medium line and the second medium line;
a power generating unit installed in the medium turbine to generate power by power that is produced from the medium turbine;
a recuperator bypass line connected to an inlet side and an outlet side of the recuperator in the first medium line;
a cross-line connected in parallel with the recuperator bypass line to connect an inlet side and an outlet side of the recuperator bypass line;
a first heat exchanger connected to the recuperator bypass line and the second flow line to perform a heat exchange process between the working medium of the recuperator bypass line and the scavenging air of the second flow line;
a second heat exchanger connected to the cross-line and the third flow line to perform a heat exchange process between the working medium of the cross-line and the exhaust gas of the third flow line; and
a third heat exchanger connected to the third flow line and the first medium line to perform a heat exchange process between the exhaust gas of the third flow line and the working medium of the first medium line.

2. The composite power generating device of claim 1, wherein the first heat exchanger is disposed on the recuperator bypass line in parallel with the recuperator, wherein the second heat exchanger is disposed on the cross-line in parallel with the first heat exchanger, and wherein the third heat exchanger is disposed between the recuperator and the medium turbine in series with the recuperator.

3. The composite power generating device of claim 1, further comprising:
a first regulating valve installed at the third flow line to regulate an opening degree of the third flow line.

4. The composite power generating device of claim 3, further comprising:
a fourth flow line branched off from the third flow line to discharge the exhaust gas of the third flow line to an outside; and
a second regulating valve installed at the fourth flow line to regulate an opening degree of the fourth flow line.

5. The composite power generating device of claim 1, further comprising:
a scavenging-air cooler installed in the second flow line to cool the scavenging air of the second flow line.

6. The composite power generating device of claim 1, further comprising:
- a first flow distribution valve disposed on a portion at which the first medium line and the inlet side of the recuperator bypass line are connected, and controlling a flow rate of the working medium that flows to the recuperator and the recuperator bypass line; and
- a second flow distribution valve disposed on a portion at which the recuperator bypass line and an inlet side of the cross-line are connected, and controlling the flow rate of the working medium that flows to the first heat exchanger and the second heat exchanger.

7. The composite power generating device of claim 1, further comprising:
- an inventory line connecting the first medium line with the second medium line;
- an inventory tank replenishing the working medium to the second medium line via the inventory line; and
- an inventory valve installed at either side of the inventory line.

8. The composite power generating device of claim 7, wherein one side of the inventory line is connected between an outlet side of the compressor and the inlet side of the recuperator in the first medium line, and the other side of the inventory line is connected between the outlet side of the recuperator and an inlet side of the compressor in the second medium line.

9. The composite power generating device of claim 7, comprising:
- a vacuum pump connected to the second medium line to create a vacuum state in the second medium line;
- a booster pump connected to the second medium line to inject the working medium into the second medium line; and
- a storage tank connected to the booster pump to supply the working medium to the booster pump.

10. The composite power generating device of claim 9, further comprising:
- a replenishment line connecting the booster pump with the inventory tank to replenish the working medium to the inventory tank.

11. The composite power generating device of claim 9, further comprising:
- a cleaning blower installed to spray the working medium onto the second heat exchanger and the third heat exchanger to eliminate fouling; and
- a cleaning line connected to the cleaning blower to supply the working medium to the cleaning blower.

12. The composite power generating device of claim 11, wherein the cleaning line is connected to the cleaning blower and the storage tank.

13. The composite power generating device of claim 11, wherein the cleaning line is connected to the cleaning blower and the inventory tank.

14. The composite power generating device of claim 9, further comprising:
- a fire extinguisher installed between the second heat exchanger and the third heat exchanger; and
- a fire extinguishing line connected to the fire extinguisher to supply the working medium to the fire extinguisher.

15. The composite power generating device of claim 14, wherein the fire extinguishing line is connected to the inventory tank or the storage tank.

16. The composite power generating device of claim 1, further comprising:
- a recirculation line disposed between the compressor and the recuperator, and connecting the first medium line with the second medium line to cause the working medium of the first medium line to flow to the second medium line; and
- a recirculation valve installed at the recirculation line.

17. The composite power generating device of claim 1, further comprising:
- a turbine bypass line disposed between the recuperator and the medium turbine, and connecting the first medium line with the second medium line to cause the working medium of the first medium line to flow to the second medium line; and
- a turbine bypass valve installed at the turbine bypass line.

* * * * *